United States Patent
Zilinskas et al.

(10) Patent No.: US 7,809,940 B2
(45) Date of Patent: Oct. 5, 2010

(54) REMOTE CERTIFICATE MANAGEMENT

(75) Inventors: Adam E. Zilinskas, Kirkland, WA (US);
Laura Delhy Machado de Wright,
Redmond, WA (US); S. Morris Brown,
Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 11/171,142

(22) Filed: Jun. 29, 2005

(65) Prior Publication Data
US 2007/0005956 A1    Jan. 4, 2007

(51) Int. Cl.
*H04L 9/00* (2006.01)
(52) U.S. Cl. ...................................... 713/156
(58) Field of Classification Search ........... 713/156, 713/158, 168, 175, 176, 193; 726/10
See application file for complete search history.

(56) References Cited

U.S. PATENT DOCUMENTS 6,233,341 B1 * 5/2001 Riggins ....................... 380/277
7,174,456 B1 * 2/2007 Henry et al. ................. 713/158

OTHER PUBLICATIONS

"Cryptography", accessible at: http://msdn.microsoft.com/library/default.asp?url=/library/en-us/seccrypto/security/cryptography_portal.asp, last accessed: Feb. 8, 2006 last updated: Dec. 2005 2 pages.
"BizTalk Server 2004 Technical Guide for Certificate Management", Oct. 2004, 102 pages.

* cited by examiner

*Primary Examiner*—Beemnet W Dada
(74) *Attorney, Agent, or Firm*—Workman Nydegger

(57) ABSTRACT

A system for managing security certificates on a plurality of remote computers comprises a certificate manager that can determine in accordance with at least one preestablished criterion whether a security certificate on a remote computer is to be managed. The system also includes an installer module that can access an account of the remote computer to manage the security certificate. Methods of using the system are also provided.

17 Claims, 15 Drawing Sheets

REMOTE CERTIFICATE MANAGEMENT

BACKGROUND

Typically server environments, especially in business contexts for those environments, use encryption to protect data communications between or among various computers. A variety of encryption schemes are commonly used, including symmetric private key systems and asymmetric public-private key systems, among others. A common implementation of these encryption schemes includes the use of a security certificate or similar security credential. A security certificate, security token, or other security credential is usually issued or maintained by a trusted entity such as a certificate authority. The certificate authority commonly acts to verify the accuracy and authenticity of security certificates or security credentials.

Use of such security certificates or security credentials typically requires the presence of a file, sometimes also called the security certificate, on each computer that communicates with another computer. Each communicating computer can usually have multiple certificates and can contain both private keys and public keys. Each communicating computer can usually use at least one public certificate to encrypt outgoing communications to each partner and another private certificate decrypt incoming communications. When so doing, each communicating computer commonly must perform a series of checks to validate a security certificate or security credential being used by checking such things as whether an expiration date for the security certificate or security credential has expired or whether an issuing authority or trusted authority has revoked the security certificate or security credential.

In cases when large numbers of machines are communicating, a very large number of security certificates or security credentials need to be managed. Usually, such management tasks involve accessing each machine to check a status of each installed security certificate or security credential and making a determination whether each such security certificate or security credential needs to be updated or replaced. This process usually has to be repeated for each account on a machine. Each machine can have many accounts. To update all necessary certificates, an administrator usually has to log in to each user or service account on each machine to access these security certificates or security credentials. Partly because of the complexity of this task, errors can easily be made. Currently, systems that use security certificates or security credentials lack a means by which such security certificates or security credentials can be adequately managed.

SUMMARY

The following presents a simplified summary in order to provide a basic understanding. This summary is not an extensive overview. It is neither intended to identify key/critical elements nor to delineate scope. Its sole purpose is to present some concepts in a simplified form as a prelude to the more detailed description later presented. Additionally, section headings used herein are provided merely for convenience and should not be taken as limiting in any way.

A certificate management system can install or verify the status of a security certificate on a remote machine. For any security certificates that are determined to be replaced, the certificate management system can automatically access a remote machine and if necessary, access individual user accounts to remove, install, replace, or otherwise manage the security certificates stored therein or thereon.

A certificate management system can automatically remove, install, replace, or otherwise manage security certificates on a plurality of user accounts on multiple machines. The security certificates can be public and are typically deployed to a common machine level location. Private certificates are typically deployed at the level of individual user or service accounts. The certificate management system provides a platform that can be used for batch management functions of a large number of certificates on a large number of machines with a correspondingly large number of user accounts.

The disclosed and described components and methods comprise the features hereinafter described and particularly pointed out in the claims. The following description and the annexed drawings set forth in detail certain illustrative aspects. These aspects are indicative, however, of but a few of the various ways in which the disclosed components and methods can be employed. Specific implementations of the disclosed and described components and methods can include some, many, or all of such components, methods and their equivalents. Variations of the specific implementations and examples presented herein will become apparent from the following detailed description when considered in conjunction with the drawings.

DETAILED DESCRIPTION

Figure 1:
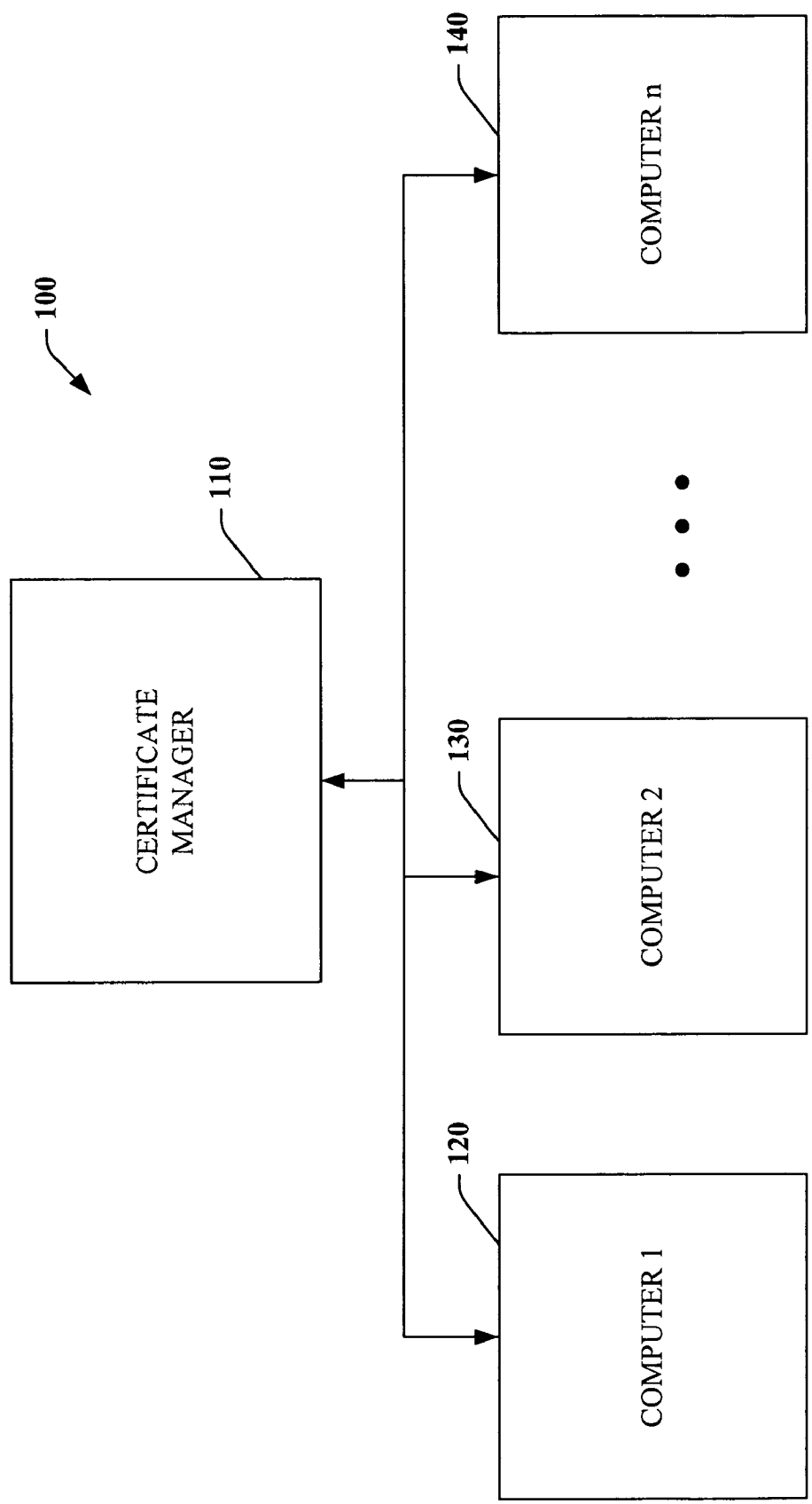
FIG. 1 is a system block diagram of a certificate management system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

FIG. 1 is a system block diagram of a certificate management system 100. The certificate management system 100 can be used to perform such tasks as verifying a status of a security certificate or security credential, installing new security certificates or security credentials, and deleting corrupted, expired, or revoked security certificates or security credentials. The certificate management system 100 can manage such security certificates or security credentials across a group of machines with each machine having one or more user accounts. Management tasks that can be performed by the certificate management system 100 can be fine-grained in the sense that the certificate management system 100 can provide access to a single certificate of a specific user account on a specific machine. Coarse-grained control over security certificates or security credentials can be provided in the sense that all security certificates or security credentials of many user accounts on many machines can be managed as a single batch or task. Levels of control in between these two levels are also possible.

The certificate management system 100 includes a certificate manager 110. The certificate manager 110 provides an interface between the user, who can be a system administrator, and the certificate management system 100. The certificate management system 100 can access multiple computers 120, 130, 140. Computers 120, 130, 140 can each host a plurality of user accounts. The certificate manager 110 can provide a platform that the system administrator can use to access security certificates or security credentials on the computers 120, 130, 140 and specifically access security certificates or security credentials of individual users having user accounts on the computers 120, 130, 140.

The computers 120, 130, 140 can be remote in the sense that each of the computers 120, 130, 140 is a separate machine from a machine hosting the certificate manager 110. Included in the concept of a separate machine are virtual machines that can be treated as separate computers regardless of whether any specific virtual machine happens to be hosted on the same physical machine as the certificate manager 110. The certificate manager 110 can include program components to manage communications between the certificate manager 110 and each of the computers 120, 130, 140.

In cases when the computers 120, 130, 140 are separate physical machines from a machine that hosts the certificate manager 110, an appropriate communication channel can be used to connect the machines for data communications. Any suitable wired or wireless data communication channel can be used to connect the computers 120, 130, 140 with the machine hosting the certificate manager 110. Among common wired communication channels that can be used are Ethernet, uniform serial bus (USB), and IEEE 1394 (Firewire), among others. Common wireless communication channels that can be employed include but is not limited to protocols such as IEEE 802.11x (WiFi) and IEEE 802.16 (WiMax), When the computers 120, 130, 140 are virtual machines, data communications systems such as inter-process communication systems can be employed. Those of ordinary skilled in the art should readily recognize that when dealing with virtual machines, the communication systems can be highly implementation-dependent.

One possible example of a mode of operation of the certificate management system 100 follows. The user, who can be a system administrator or another user having sufficient administrative or access privileges to perform certificate management tasks, accesses the certificate management system 100 by using the certificate manager 110. The certificate manager 110 can query each of the computers 120, 130, 140 to obtain a list of all security certificates or security credentials installed on each computer 120, 130, 140, for the desired accounts.

The user can cause the certificate manager 110 to verify each security certificate or security credential in the list of selected computers and accounts. A verification of a certificate includes operations such as a check of the expiration date and validity for each security certificate or security credential by contacting an issuing authority or a trusted authority, usually referred to as a certificate authority. Such verification steps can be performed using a web service or an established communication protocol set up for that specific purpose. Other techniques can also be used.

The certificate manager 110 will present a report of the results of its validation check to the system administrator. The user can then use these verification results to determine whether to remove, replace, or install a new security certificate or security credential. For each security certificate or security credential to be replaced or installed, the certificate manager 110 can access each appropriate user account on each computer 120, 130, 140 to perform the operation. These management tasks can be performed manually, such as in response to specific directions provided by system administrator. Alternatively, these tasks can be performed automatically in a manner akin to routine system maintenance tasks. A combination of manual and automatic approaches can also be used.

Figure 2:
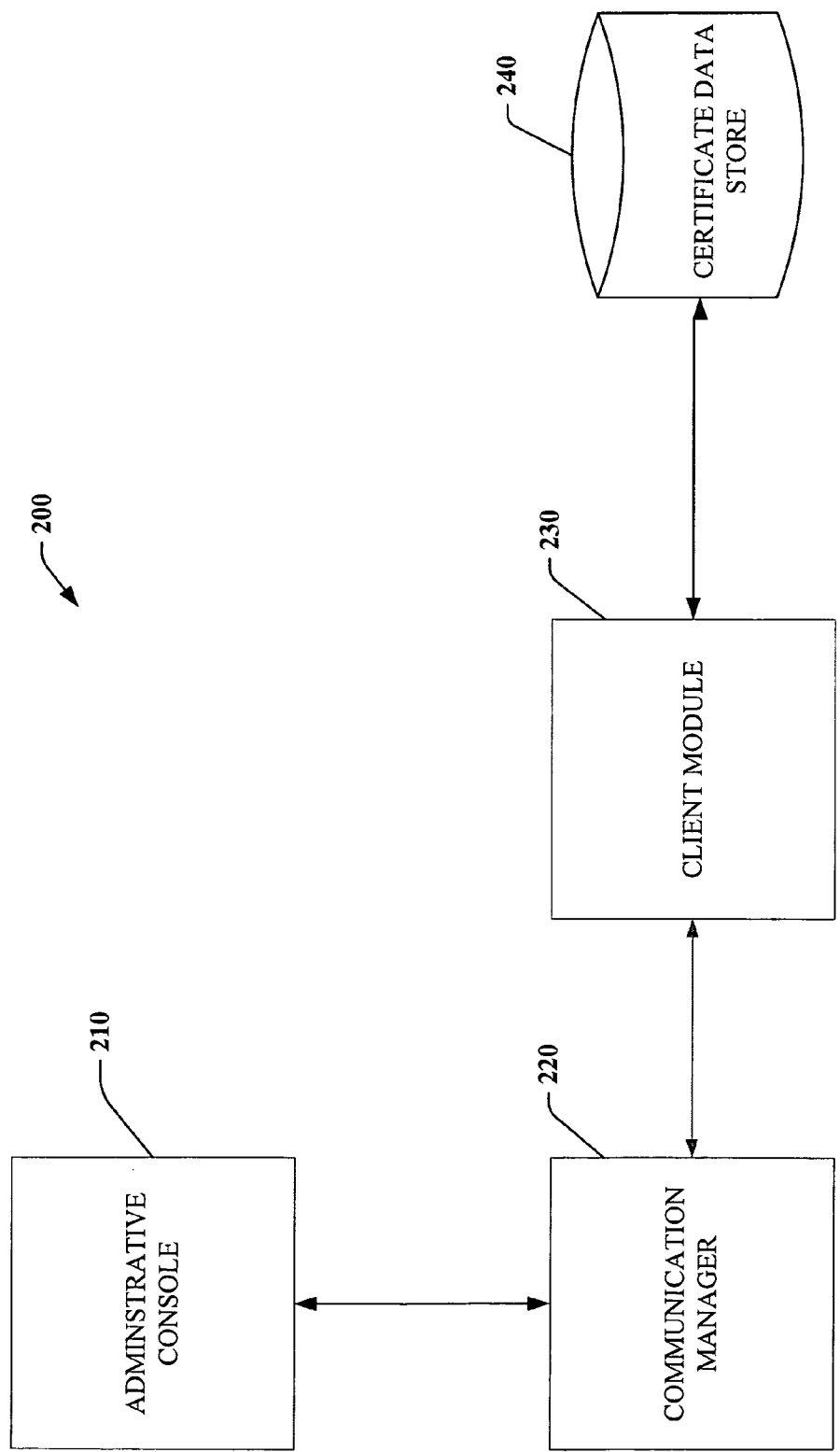
FIG. 2 is a system block diagram of a certificate management system.

FIG. 2 is a system block diagram of a certificate management system 200 describing the communication between the administration console and a specific client computer. The certificate management system 200 can perform a variety of security certificate or security credential management tasks. These security certificate or security credential management tasks can specifically include any of the tasks previously disclosed and described in conjunction with FIG. 1.

The certificate management system 200 includes the administrative console 210. The administrative console 210 can provides the user interface to the certificate management system 200. This user interface can be a graphical user interface (GUI) or another type of user interface. Specifically contemplated interfaces include interfaces such as text-based interfaces, web-based interfaces built upon or using a web browser such as any of the browsers that can be used to access pages on the world wide web, or command line interfaces, among others. The administrative console 210 communicates with the client computers using the communication manager 220. The communication manager 220 can initiate, track, and otherwise manage communications between and among components, specifically including components of the certificate management system 200 and remote computers, such as the computers 120, 130, 140 of FIG. 1.

When managing communications with remote computers, the communication manager 220 communicates with a client module 230 residing on the remote computer that performs certificate management tasks received from the certificate management console 210. The client module 230 can be implemented as a communication client, as a communication peer, or as a background process or daemon, among other ways.

The client module 230 handles the verification, installation or deletion of security certificates or security credentials on the remote computer. To do so, the client module 230 accesses the proper certificate data store 240 (either machine or user account specific store). The certificate data store 240 contains the security certificates or security credentials for that machine and/or user account.

An example of a possible mode of operation of the certificate management system 200 follows. The user must have sufficient access rights, such as a system administrator, accesses the certificate management system 200 by using the administrative console 210. The administrative console 210 accepts input from the system administrator that instructs the certificate management system 200 to replace one or more security certificates or security credentials on one or more remote machines. The communication manager 220 establishes communications between the certificate management console 210 and each remote client module 230, including specific user accounts when appropriate, for installation of the security certificate or security credential.

The client module 230 accesses certificates in the certificate data store 240 to obtain the security certificate or security credential that was selected by the system administrator. The client module 230 installs the selected security certificate or security credential on each machine, or within each user account, as directed by a user such as a system administrator. To do so, the client module 230 accesses the commands input by the system administrator using the administrative console 210 and uses the communication channels established by the communication manager 220. The client module 230 can additionally perform a check to ensure that each security certificate or security credential was properly installed and can either repeatedly attempt installation if such installation failed or can generate an appropriate error message for presentation to the system administrator at the administrative console 210.

Figure 3:
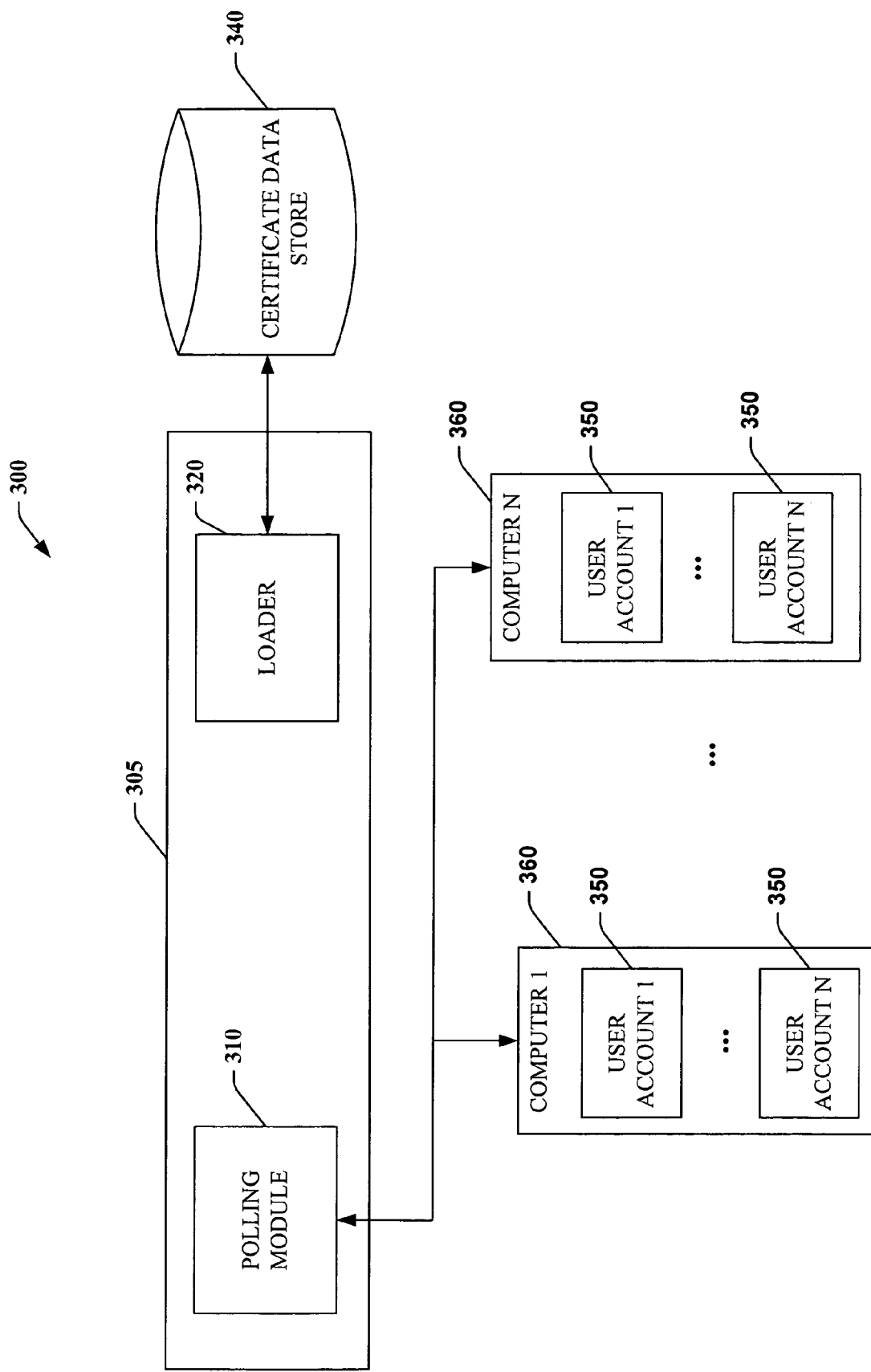
FIG. 3 is a system block diagram of an installer system.

FIG. 3 is a system block diagram of an installer system 300. The installer system 300 can perform management tasks on a remote computer. Specifically, the installer system 300 can process commands and transfer files to cause such files to be installed, removed, or replaced.

The installer module 305 includes a polling module 310. The polling module 310 can access the desired user accounts and each of currently-installed security certificates or security credentials. The installer module 305 also includes a loader 320. The loader 320 can communicate with the certificate data store 340. The certificate data store 340 includes the security certificates or security credentials that have been previously approved for use by a system administrator.

One possible example of operation of the client module 300 follows. The polling module 310 accesses each user account 350 of the remote machine 360 and compiles a list of currently-installed security certificates or security credentials. The loader 320 can then replace the security certificates or security credentials in the certificate data store 340 by accessing the particular user account and the certificate data store for that account. In various implementations, other types of certificate stores, including but not limited to, machine-wide stores and account-level stores, can be accessed as appropriate.

Figure 4:
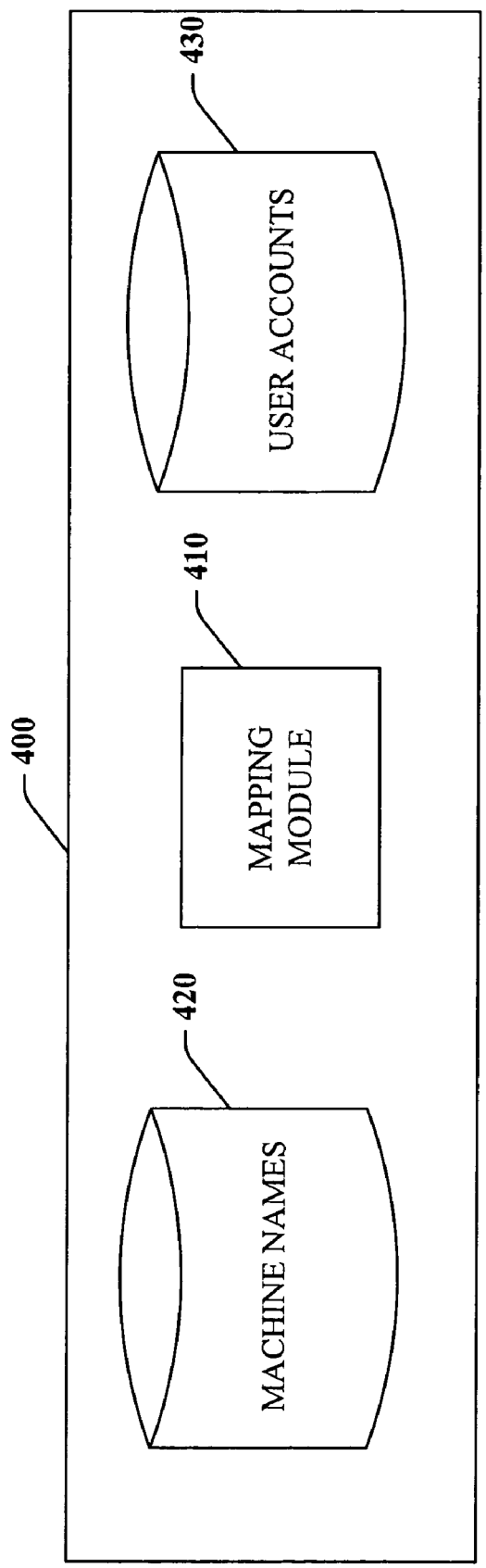
FIG. 4 is a system block diagram of a user and machine mapping module.

FIG. 4 is a system block diagram of a user and machine mapping module 400. The user and machine mapping module 400 can provide a platform that can be used to obtain machine names, user accounts associated with such machine names, and security certificates associated with either a user account or machine name, or both. The user and machine mapping module 400 specifically can be used to create a system-wide picture of the location of securities certificates or security credentials. The user and machine mapping module 400 can be accessed by an administration console, such as the administration console 210 of FIG. 2.

The user and machine mapping module 400 includes a mapping module 410. The mapping module 410 can access two data stores. The first data store is a machine name data store 420. The machine name data store 420 can include all names of machines for which security certificates or security credentials can be remotely managed. The second data store is a user account data store 430. The user account data store 430 includes all user accounts for valid or authorized users of machines for which securities certificates or security credentials can be remotely managed. The mapping module 410 can map a user account from the user account data store 430 to a machine name from the machine names data store 420 to create a location of a security certificate or a security credential that other components, such as one of the security certificate management systems previously discussed in conjunction with other figures, can manage.

It should be appreciated that the components and methods described provide general frameworks for device configuration management. Among the uses for such components and methods are initial and updated configuration of groups of homogeneous or heterogeneous devices having security certificate or security credential capabilities. Also possible is an ability to query a device (or group of devices) to determine a current configuration state and based upon that state, determine whether to send new or additional configuration information to the device. One additional benefit is the ability to automatically configure large numbers of devices using batch processing techniques.

Figure 5:
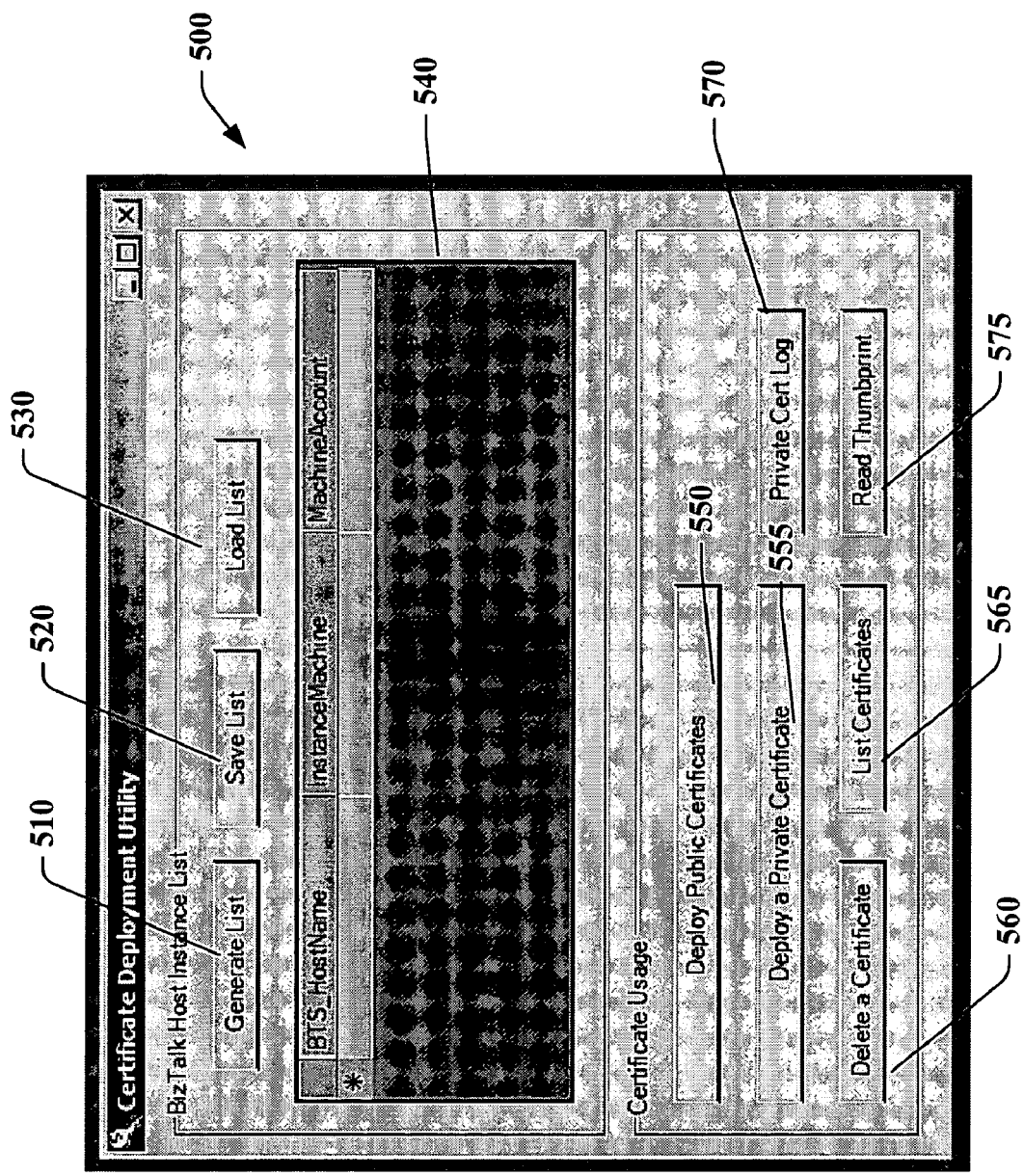
FIG. 5 is a diagram of a portion of a graphical user interface.

FIG. 5 is a diagram of the portion of the graphical user interface 500 that can be used in conjunction with a certificate management system. The graphical user interface 500 can provide a means by which a user, such as a systems administrator, can issue commands to a certificate management system. The graphical user interface 500 includes a generate list button 510. The generate list button 510 can be used to issue a command to a machine and mapping module, such as the machine and mapping module 500 of FIG. 5, to generate a list of all remote machines and user accounts within each of those remote machines. This list can be used to choose the machines and/or accounts to which a certificate is to be deployed. The list can be edited as needed and a save list button 520 can be used to issue a command to save the modified list. A load list button 530 can be used to load a previously-saved list for reuse by management system. A display area 540 provides an area within which information in a list is presented and edited by the user.

A deploy public certificates button 550 can be used to issue a command to an underlying certificate management system to deploy selected public certificates to the shown list of remote machines. A deploy private certificates button 555 can be used to issue a similar command relating to a private security certificate or security credential to multiple machines and user accounts within those machines which is shown in the list 540. A delete certificate button 560 can be used to delete a certificate from listed machines and/or user accounts. A list certificates button 565 can be used to verify and show a list available security certificates or security credentials on the listed machines and/or user accounts. A read thumbprint button 575 can be used to issue a command to read a summary associated with a security certificate or security credential.

Figure 6:
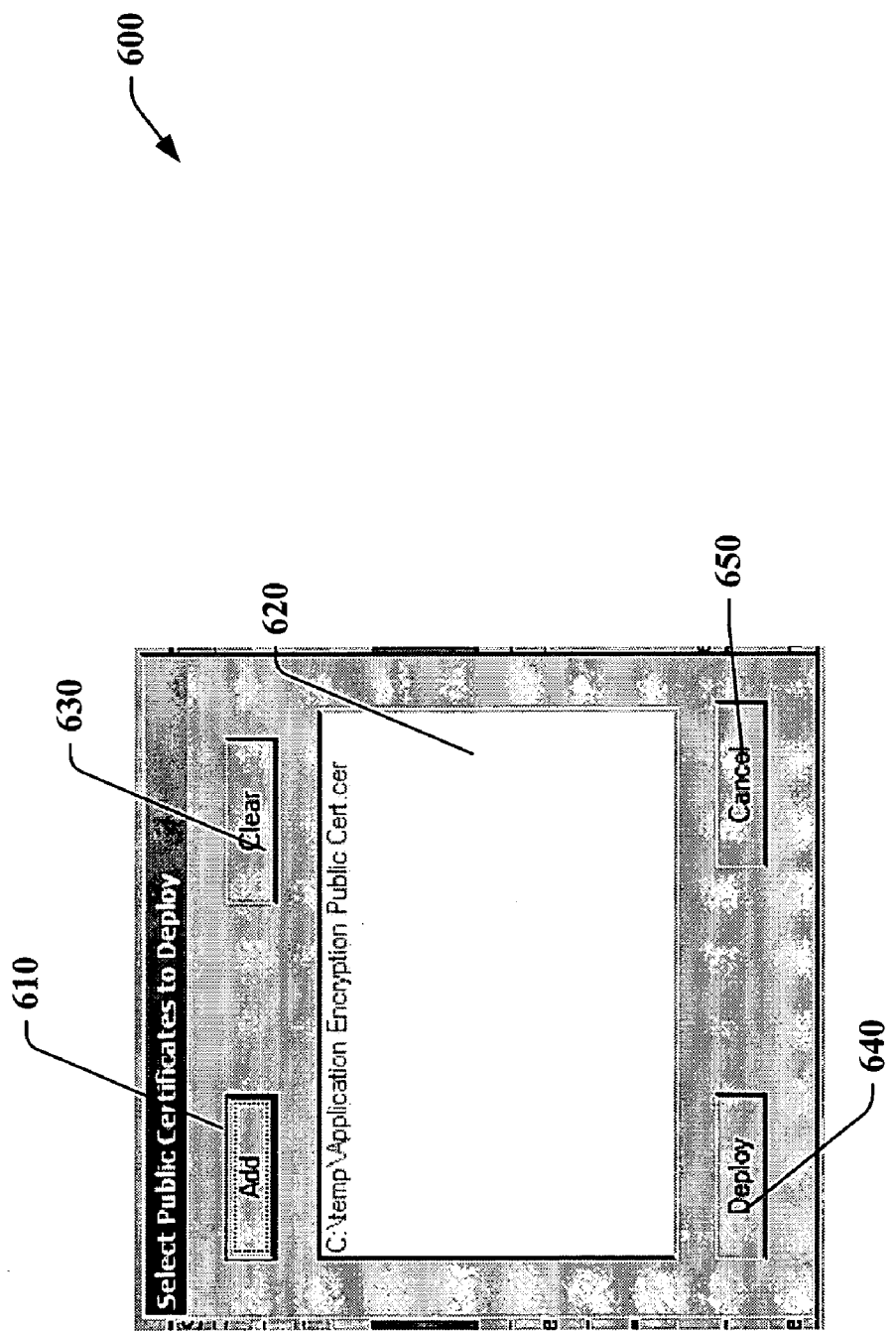
FIG. 6 is a diagram of a portion of a graphical user interface.

FIG. 6 is a diagram of a portion of the graphical user interface 600 that can be used in conjunction with a certificate management system. This display can be used when the Deploy Public Certificate command 550 of FIG. 5 is issued. The interface allows a selection of multiple public certificates to be installed on the listed machines. The interface 600 includes an add button 610 that can be used enter a reference of the public certificate into the display list 620. A display list 620 provides an area within which certificates are to be deployed can be listed for review by the user. A clear button 630 provides a means by which the user can clear entries added to 620. A deploy button 640 issues the command to the underlying certificate management system to deploy the certificates displayed in the display area 620 to the machines listed. A cancel button 650 can be used to exit the graphical user interface 600 without issuing any operations.

Figure 7:
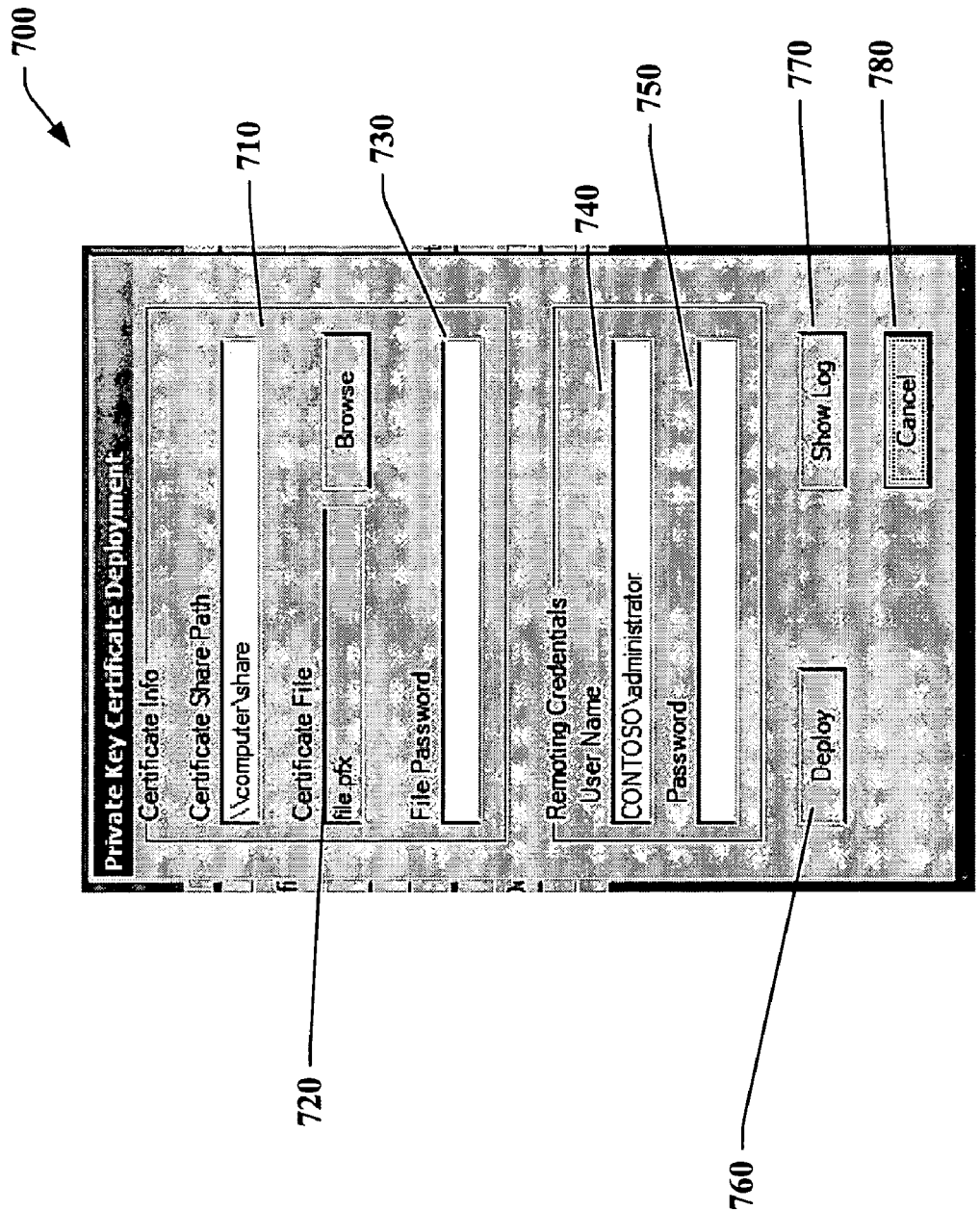
FIG. 7 is a diagram of a portion of a graphical user interface.

FIG. 7 is a diagram of a portion of a graphical user interface 700 that can be used with an underlying certificate management system. The graphical user interface 700 provides a means by which a user, such as a system administrator, can select a private key certificate to deploy and can control details of deployment. A private key certificate file must be stored in a location that is accessible by the remote computer. Typically this is a network share with specifically controlled access rights. The graphical user interface 700 has the path area 710 that displays a location of the secure network share. A certificate file area 720 displays the specific certificate to be deployed. A private key certificate is typically password protected. A file password area 730 provides a means by which the user can enter any necessary file access password. A credentials area 740 provides a means by which the user can provide appropriate authentication credentials for a user account with enough permissions to access the remote computers and the secure file share to install the certificate. The Deploy button 750 will perform the command to install the private certificate to each user account on each machine. The Show Log button 760 will display the collected results/report of the operation on the machines. The Cancel button 770 will exit the interface without issuing any commands.

Figure 8:
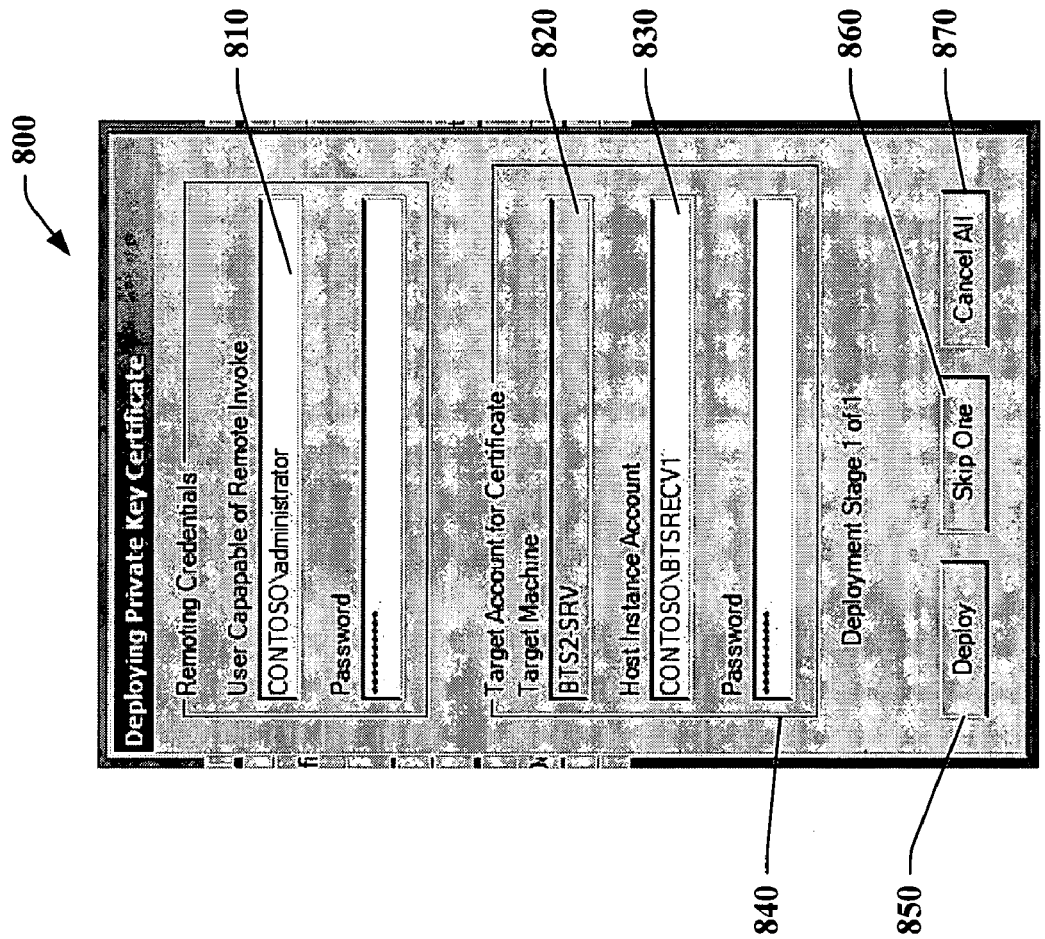
FIG. 8 is a diagram of a portion of a graphical user interface.

FIG. 8 is a diagram of a portion of a graphical user interface 800 that can be used with an underlying certificate management system. The graphical user interface 800 can appear when deploying a private key certificate to multiple machines. It is displayed for each account on each machine listed. The graphical user interface 800 includes a remote credential area 810 into which the user can provide sufficient security credentials or other authentication information that enables the user to remotely access the remote machine shown in 820. A target account area 830 provides a means by which the user can specify a user account on the remote machine into which a security certificate or security credential will be installed. The user also provides a password for the target user account in 840.

The Deploy button 850 can cause performance of the command for that machine and that user account. The Skip One button 860 can cause the process to simply proceed to the next item in the list. The Cancel All button 870 can cause termination of processing for remaining items in the list.

With reference to FIGS. 9-13, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

Figure 9:
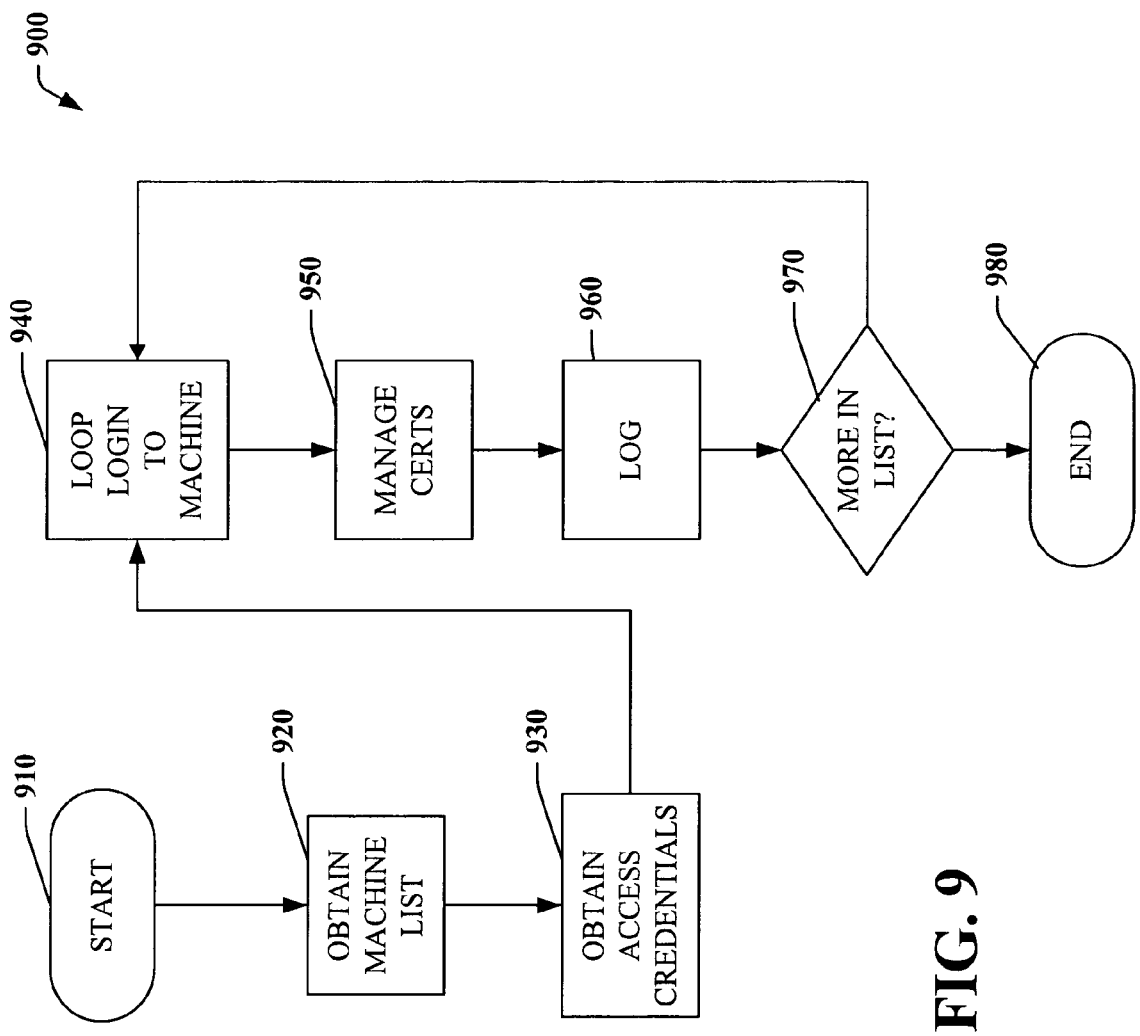
FIG. 9 is a flow diagram of a general processing method.

FIG. 9 is a flow diagram of a general processing flow 900 that can be employed with a certificate management system. The general processing flow 900 can be used to remotely manage public key security certificates or security credentials on remote machines. Specifically, the general processing flow 900 can be used to manage a retrieved list of public security certificates or security credentials.

Processing of the general processing flow to 900 begins at START block 910 and continues to process block 920. At process block 920, a list of machines and/or user accounts that can be accessed and managed by a certificate management system is obtained. At process block 930, the user provides an appropriate access credentials to access the remote machines listed by 920.

Processing continues to a looping process block 940 where the certificate management system logs into each machine. Certificates are managed at process block 950. The operation success or failure is logged to a common location at process block 960. Processing continues into a loop from decision block 970 to process 940 until all items obtained in process block 920 have been processed. Processing concludes at END block 980.

Figure 10:
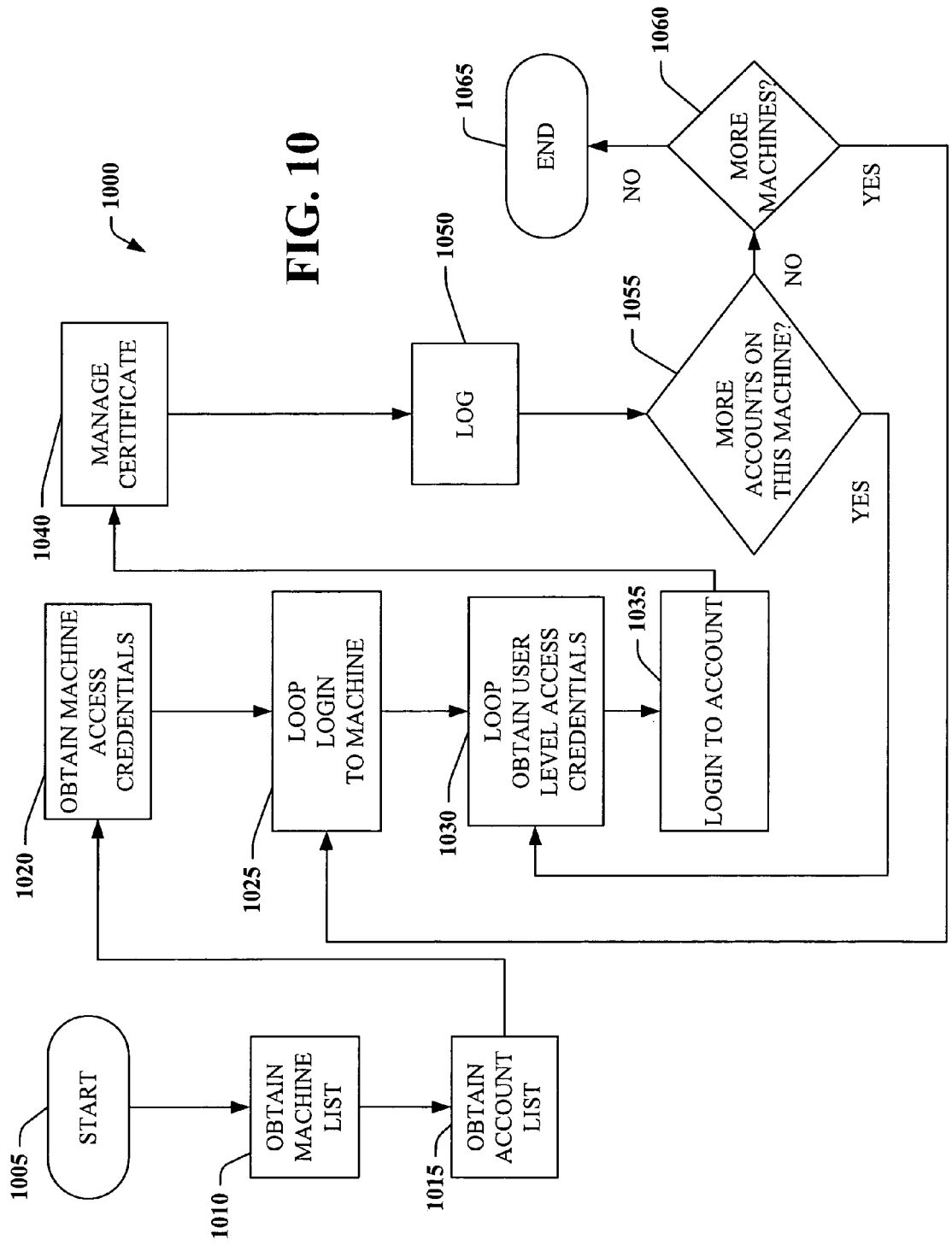
FIG. 10 is a flow diagram of a general processing method.

FIG. 10 is a flow diagram of a general processing flow 1000 that can be employed with a certificate management system. The general processing flow 1000 can be used remotely manage private key security certificates associated with specific user accounts on the remote machines.

Processing of the general process flow 1000 begins at START block 1005 and continues to process block 1010. At process block 1010, a list of remote machines that can be accessed is obtained. At process block 1015, a list of user accounts that can be accessed on remote machines in the list of accessible remote machines is obtained. Processing continues to process block 1020 where access credentials needed to communicate with each remote machine are obtained.

A loop process starts at process block 1025 where the user logs into a remote machine from the list of accessible remote machines. At process block 1030, an internal loop process begins where the user is prompted for appropriate user-level access credentials to allow access to specific user accounts. Processing continues to process block 1035 where the certificate management system logs into the specific user account of the remote machine. At process block 1040, security certificates or security credentials associated with that user account are managed by the certificate management system. Success or failure of the management operations are logged at process block 1050.

At decision block 1055, a determination is made whether additional user accounts with credentials to be managed remain on the remote machine being accessed. If yes, processing returns to process block 1030. If no, processing continues to decision block 1060. At decision block 1060, a determination is made whether additional machines need to be accessed. If yes, processing returns to process block 1025. If no, processing concludes at END block 1060.

Figure 11:
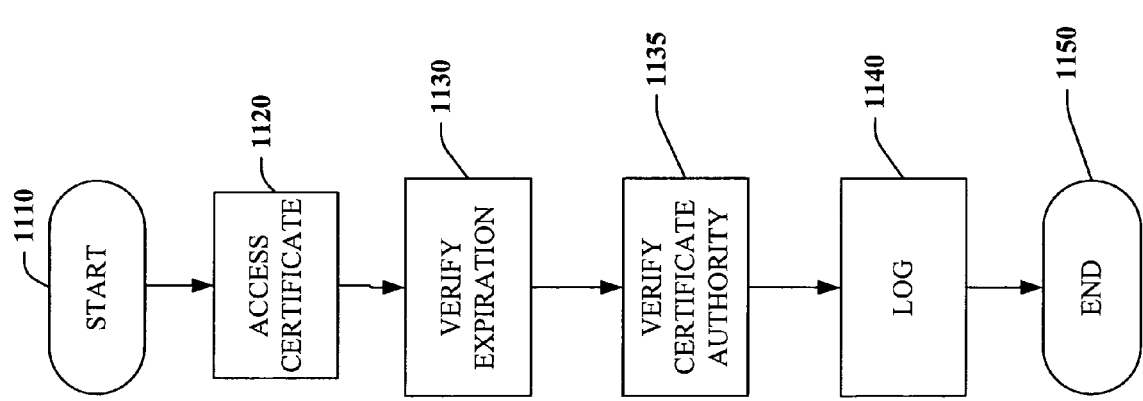
FIG. 11 is a flow diagram of a general processing method.

FIG. 11 is a flow diagram of a general processing method 1100 that can be used with components that are disclosed or described herein. The general processing method 1100 can be used to verify a certificate to be replaced. Processing of the method 1100 begins at START block 1110 and proceeds to process block 1120 where a particular certificate is accessed. At process block 1130, the certificate expiration date is checked. Processing continues to process block 1135 where the issuing authority for this certificate is contacted to check the validity and revocation of the certificate. The result of the verification checks can be logged to a common area for a summary report at process block 1140. Processing concludes at END block 1150.

Figure 12:
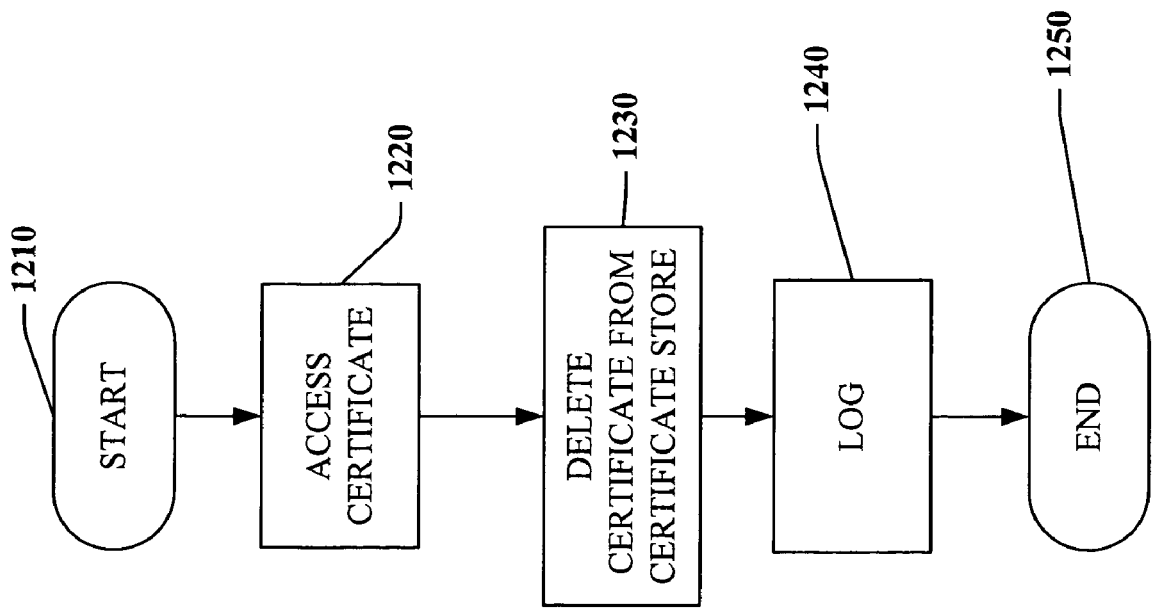
FIG. 12 is a flow diagram of a general processing method.

FIG. 12 is a flow diagram of a general processing method 1200 that can be used for deleting a certificate. Processing of the method begins at START block 1210 and continues to process block 1220 where the particular certificate is accessed. Processing continues to process block 1230 where a delete command is issued to the certificate store. At process block 1240 results of the deletion operation are logged to a common area for a summary report. Processing concludes at END block 1250.

Figure 13:
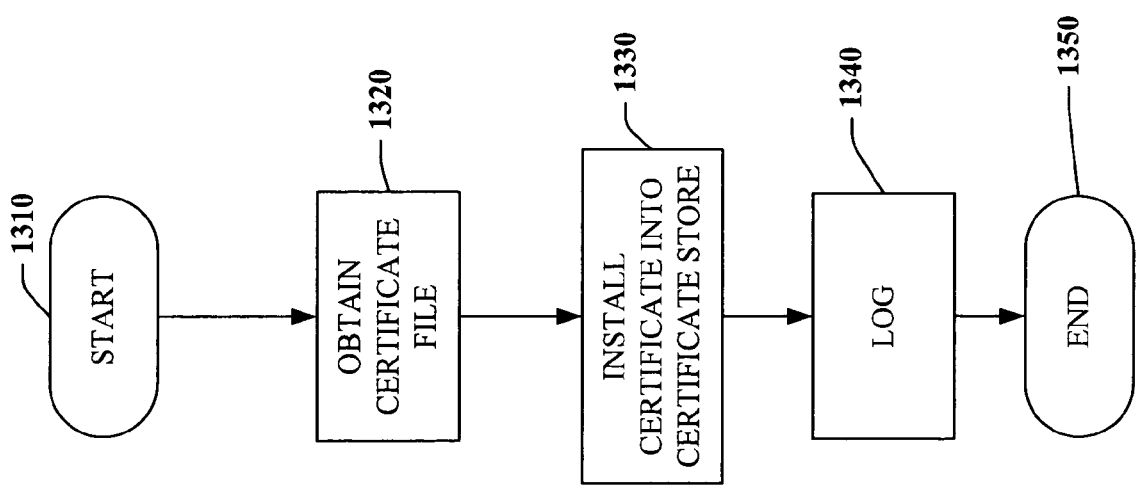
FIG. 13 is a flow diagram of a general processing method.

FIG. 13 is a flow diagram of a general processing method 1300 that can be used for installing/replacing a certificate. Processing of the method 1300 begins at START block 1310. Processing continues to process block 1320 where the certificate file is provided to the remote computer. For public certificates, this is provided directly. For private certificates, the system will log into the particular user account and, using provided access credentials, access the certificate file in the secure network share. At process block 1330, the certificate is inserted into the certificate store. Processing continues at process block 1340 where results of the insertion operation are logged to a common area for a summary report. Processing concludes at END block 1350.

Figure 14:
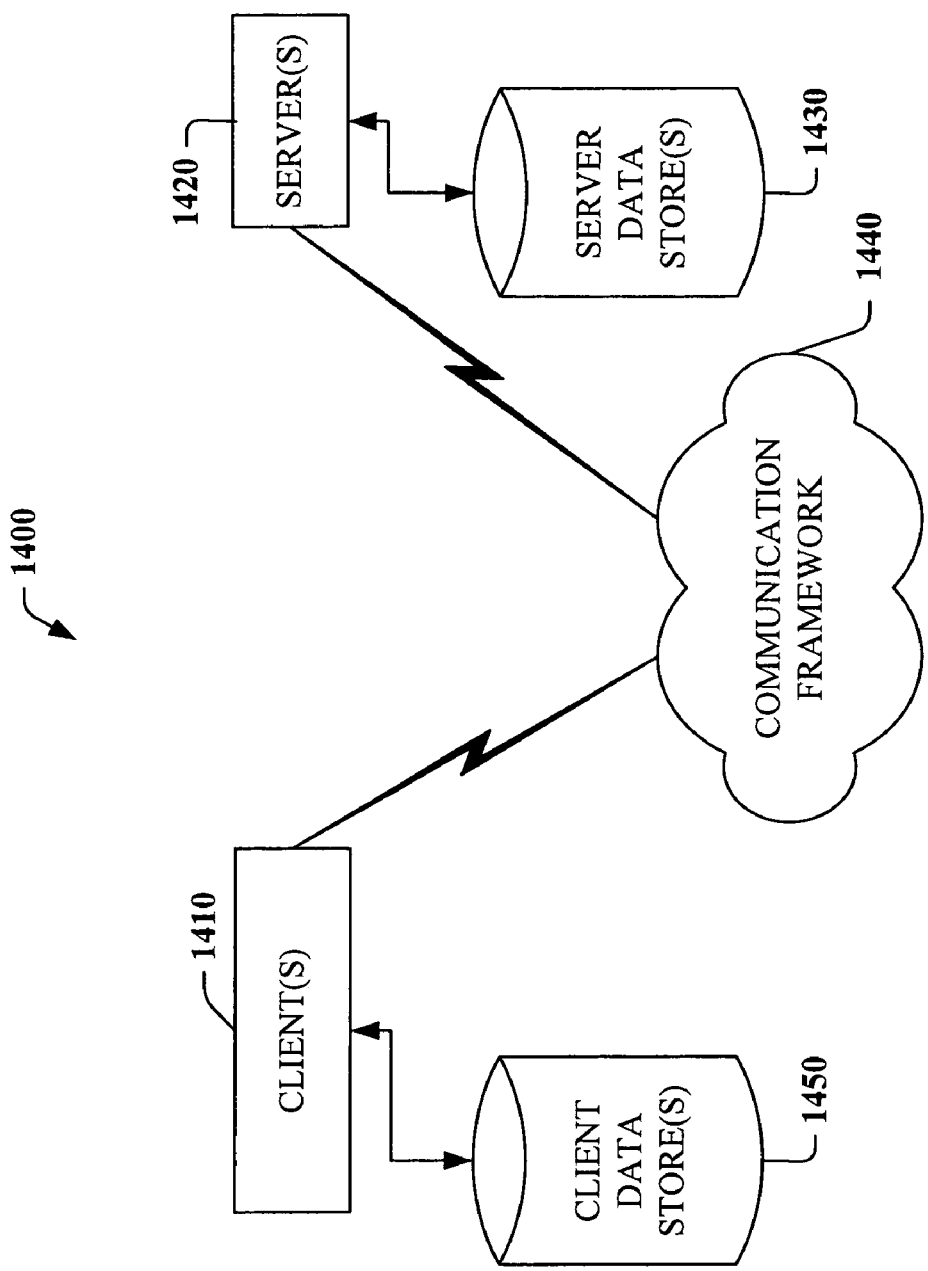
FIG. 14 is a system block diagram of an exemplary networking environment.
Figure 15:
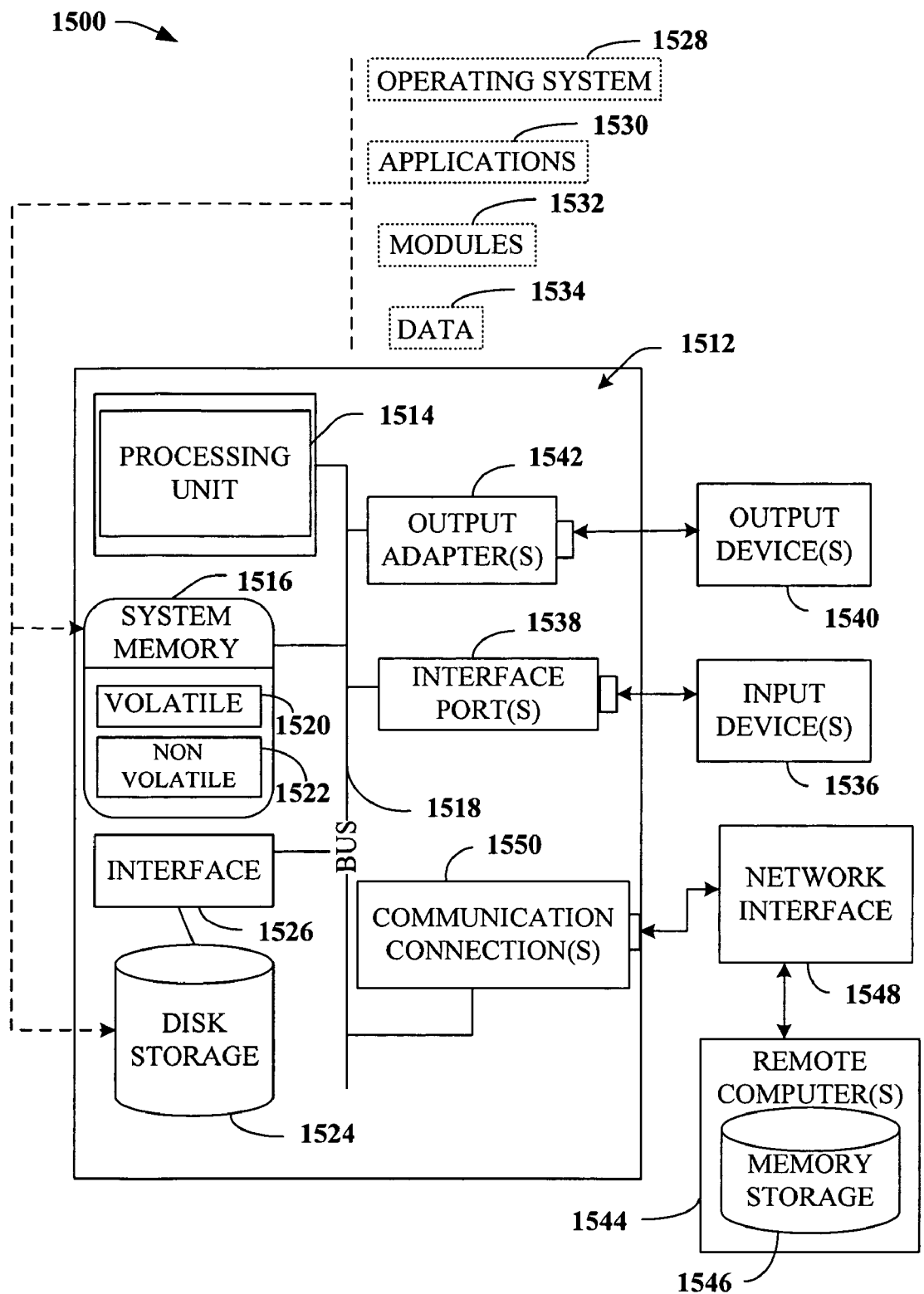
FIG. 15 is a system block diagram of an exemplary operating environment.

In order to provide additional context for implementation, FIGS. 14-15 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

FIG. 14 is a schematic block diagram of a sample-computing environment 1400 within which the disclosed and described components and methods can be used. The system 1400 includes one or more client(s) 1410. The client(s) 1410 can be hardware and/or software (for example, threads, processes, computing devices). The system 1400 also includes one or more server(s) 1420. The server(s) 1420 can be hardware and/or software (for example, threads, processes, computing devices). The server(s) 1420 can house threads or processes to perform transformations by employing the disclosed and described components or methods, for example. Specifically, one component that can be implemented on the server 1420 is a configuration server, such as the configuration server 140 of FIG. 1. Additionally, various security or authentication modules, such as the authentication module 430 discussed in conjunction with FIG. 4, can also be implemented as components of the server 1420. Various other disclosed and discussed components can be implemented on the server 1420.

One possible means of communication between a client 1410 and a server 1420 can be in the form of a data packet adapted to be transmitted between two or more computer processes. The system 1400 includes a communication framework 1440 that can be employed to facilitate communications between the client(s) 1410 and the server(s) 1420. The client(s) 1410 are operably connected to one or more client data store(s) 1450 that can be employed to store information local to the client(s) 1410. Similarly, the server(s) 1420 are operably connected to one or more server data store(s) 1430 that can be employed to store information local to the server(s) 1440.

With reference to FIG. 15, an exemplary environment 1500 for implementing various components includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Peripheral Component Interconnect Express (PCI Express), ExpressCard, Card Bus, Universal Serial Bus (USB), Advanced Graphics Port (AGP), Personal Computer Memory Card International Association bus (PCMCIA), Firewire (IEEE 1394), Serial Advanced Technology Attachment (SATA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/non-volatile computer storage media. For example, FIG. 15 illustrates a disk storage 1524. The disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

The various types of volatile and non-volatile memory or storage provided with the computer 1512 can be used to store components of various implementations of the data port signaling system disclosed and described herein. For example, with reference to FIG. 1, the configuration data store 150 can be implemented as a software module in the non-volatile memory 1522. At runtime, information from the configuration data store 150 can be loaded into the volatile memory 1520 from where machine-interpretable code of the firmware 160 can be accessed by the processing unit 1514 and thereby placed into execution.

It is to be appreciated that FIG. 15 describes software that acts as an intermediary between users and the basic computer resources described in the suitable operating environment 1500. Such software includes an operating system 1528. The operating system 1528, which can be stored on the disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the disclosed components and methods can be implemented with various operating systems or combinations of operating systems.

A user enters commands or information into the computer 1512 through input device(s) 1536. The input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. The interface ports 1538 specifically can include various data connection ports that can be used with components disclosed and described herein, among others.

Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes illustrative examples of certain components and methods. It is, of course, not possible to describe every conceivable combination of components or methodologies, but one of ordinary skill in the art will recognize that many further combinations and permutations are possible. Accordingly, all such alterations, modifications, and variations are intended to fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the herein illustrated examples. In this regard, it will also be recognized that the disclosed and described components and methods can include a system as well as a computer-readable medium having computer-executable instructions for performing the acts and/or events of the various disclosed and described methods. In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for managing security certificates on a plurality of remote computers, comprising:
   a processor; and
   a memory communicatively coupled to the processor, the memory having stored therein computer-executable instructions configured to implement the system for managing security certificates including:
      a receiving module that can receive an indication of one or more selected users for whom a security certificate installation status is to be determined;
      a certificate manager that can determine in accordance with at least one preestablished criterion whether a security certificate on a remote computer is to be managed, the certificate manager further querying the remote computer to determine which security certificates are installed on the remote computer for one or more selected users; and
      an installer module that can access an account of the remote computer to manage the selected user's security certificate.

2. The system of claim 1, wherein the installer module can delete the security certificate.

3. The system of claim 1, wherein the installer module can replace the security certificate with a second security certificate.

4. The system of claim 1, wherein the installer module can add at least one additional security certificate to the remote computer.

5. The system of claim 1, further comprising a verification module that can check a status of the security certificate.

6. The system of claim 5, wherein the verification module can access a certificate authority.

7. The system of claim 6, wherein the certificate authority is an issuing authority.

8. The system of claim 6, wherein the verification module can verify an expiration date.

9. The system of claim 1, wherein the certificate manager queries the remote computer to determine a configuration utilizing batch processing techniques.

10. The system of claim 1, wherein security certificate is a multi-session certificate.

11. The system of claim 10, wherein the certificate manager manages the security certificates utilizing batch processing techniques.

12. At a computer system that includes a processor and system memory, a computer-implemented method for managing security certificates, the method comprising:
    receiving an input from a user requesting a status for one or more security certificates associated with one or more remote computer users on at least one remote computer system;
    querying the requested remote computer system to determine which security certificates are installed for the indicated users; and
    providing a report to the user identifying each of the security certificates associated with the remote computer users on the at least one remote computer system.

13. The method of claim 12, further comprising:
    receiving a subsequent input from the user indicating that the identified security certificates are to be verified, wherein the verification includes:
       checking the expiration date of each security certificate; and
       checking the validity of each security certificate by contacting the certificate's issuing authority.

14. The method of claim 13, wherein the verification is performed using a web service.

15. The method of claim 13, further comprising providing a verification report to the user indicating the results of the security certificate verification.

16. The method of claim 15 further comprising:
    receiving a subsequent input from the user indicating that, based on the verification report, one or more security certificates on the at least one remote computer system are to be removed, replaced or newly installed.

17. At a computer system that includes a processor and system memory, a computer-implemented method for managing security certificates, the method comprising:
    receiving an input from a user requesting a status for one or more security certificates associated with one or more remote computer users on at least one remote computer system;
    querying the requested remote computer system to determine which security certificates are installed for the indicated users;
    providing a report to the user identifying each of the security certificates associated with the remote computer users on the at least one remote computer system;
    receiving a first subsequent input from the user indicating that the identified security certificates are to be verified, wherein the verification includes:
       checking the expiration date of each security certificate; and
       checking the validity of each security certificate by contacting the certificate's issuing authority;
    providing a verification report to the user indicating the results of the security certificate verification; and
    receiving a second subsequent input from the user indicating that, based on the verification report, one or more security certificates on the at least one remote computer system are to be removed, replaced or newly installed.

* * * * *